US006349459B1

(12) United States Patent
Dean

(10) Patent No.: US 6,349,459 B1
(45) Date of Patent: Feb. 26, 2002

(54) RING SEAL SEATING TOOL

(75) Inventor: Michael Bruce Dean, Castle Rock, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/521,725

(22) Filed: Mar. 9, 2000

Related U.S. Application Data

(60) Provisional application No. 60/123,903, filed on Mar. 11, 1999.

(51) Int. Cl.[7] ........................ B23P 19/02
(52) U.S. Cl. ........................ 29/235; 29/263
(58) Field of Search ........................ 29/451, 235, 270, 29/283, 282, 278, 280, 263, 262, 274, 229

(56) References Cited

U.S. PATENT DOCUMENTS 3,030,700 A 4/1962 Jensen
3,319,325 A 5/1967 Nessamar et al.
4,212,096 A 7/1980 Saito et al.
4,501,054 A 2/1985 Morgan
5,050,282 A * 9/1991 Zannini ........................ 29/235
5,103,548 A * 4/1992 Reid et al. ..................... 29/263
5,299,347 A 4/1994 Decker
5,581,865 A 12/1996 Will
6,012,209 A * 1/2000 Whetstone ................... 29/235

* cited by examiner

*Primary Examiner*—Robert C. Watson
(74) *Attorney, Agent, or Firm*—Marsh Fischmann & Breyfogle LLP

(57) ABSTRACT

A tool for positioning or seating a ring seal within an annular groove of a seal fitting is disclosed. Generally, the ring seal seating tool of the present invention includes a first member for receiving a ring seal fitting to support such fitting during seating operations, a second member for at least aligning the ring seal with the ring seal groove of the ring seal fitting, and a third member for advancing the ring seal into the ring seal groove via the second member.

20 Claims, 8 Drawing Sheets

RING SEAL SEATING TOOL

RELATED APPLICATION

This application claims priority benefit of U.S. Provisional Application Ser. No. 60/123,903, filed on Mar. 11, 1999, entitled "RING SEAL SEATING TOOL", the entire disclosure of which is incorporated by reference in its entirety herein.

FIELD OF THE INVENTION

The present invention generally relates to a tool for positioning a seal within a groove and in particular, to a tool for seating a ring seal within an annular groove of a seal fitting.

BACKGROUND OF THE INVENTION

Use of existing devices for installing ring seals within ring seal grooves of ring seal fittings is generally problematic since such devices are not typically capable of reliably seating the ring seal within the ring seal groove. Further, installing ring seals using existing devices is an expensive, time consuming, labor intensive task. For example, installation time for a ¼" ring seal with existing devices can be 30 minutes or more. And such installation times can be a concern in some applications where it is important to maintain compliance with clean requirements. For instance, in some aerospace applications, where a ring seal on a ring seal fitting must be replaced, for purposes of preserving clean conditions, the replacement ring seal should be seated within the ring seal groove of ring seal fitting within 1 minute of removal of the ring seal fitting from the aerospace system (e.g., rocket engine), so that the ring seal fitting may then be reconnected to the aerospace system in a timely manner.

SUMMARY OF THE INVENTION

Accordingly, it is an object of the present invention to provide a tool for quickly and efficiently seating a ring seal within a ring seal groove of a ring seal fitting.

It is another object of the present invention to provide a reliable tool for properly/effectively seating a zing seal within a ring seal groove of a ring seal fitting.

The tool of the present invention achieves one or both of these objectives by providing an easy to use ring seal seating tool which quickly, reliably and properly installs ring seals within ring seal grooves of ring seal fittings. In this regard, the seating tool of the present invention generally includes a first member for receiving a ring seal fitting to support such fitting during seating operations, a second member for at least aligning the ring seal with the ring seal groove of the ring seal fitting, and a third member for advancing the ring seal into the ring seal groove via the second member.

More specifically, in one embodiment, the seating tool of the present invention includes a ramp member for receiving the ring seal thereover, the ramp member including first and second end portions and a first wall (e.g., outer wall), a pusher member for moving the ring seal along the first wall of the ramp member into an annular groove of a seal fitting, the pusher member including a first end portion for engaging the ring seal, and a guide member for supporting the seal fitting during seating operations, the guide member including first and second portions, the first portion of the guide member for supportably engaging the seal fitting and the second portion of the guide member for guiding the pusher member towards the first end portion of the seal fitting, the first end portion of the pusher member being receivable within the second portion of the guide member.

In some instances, the seal fitting may include a tapered portion and, as such, the ring seal to be seated within an annular groove of the seal fitting may include a beveled or inclined surface. In this regard, the first end portion of the pusher member may include a correspondingly beveled surface for abuttingly engaging the beveled surface of the ring seal. Such a beveled surface on the first end portion of the pusher member for abuttingly engaging the corresponding beveled surface of the ring seal facilitates seating of the ring seal within the annular groove of the seal fitting while inhibiting scarring or galling of the ring seal. In addition, such seal fittings may include a first passage way therethrough. In this regard, the ramp member of the present invention may include a projection portion adapted to be received within the first passage way of the seal fitting in order to enhance and/or facilitate alignment of the ring seal with the annular groove of the seal fitting. In order to further enhance and/or facilitate alignment of the ring seal with the annular groove of the seal fitting, the ramp member may further include an annular lip adapted to receive at least a portion of the first end portion of the seal fitting. Finally, in order to further enhance alignment of the ring seal with the annular groove of the seal fitting, the second portion of the guide member is adapted to receive both first end portions of the pusher member and the ramp member, the first end portion of the pusher member being slideable relative to the first end portion of the ramp member and the inner wall of the second portion of the guide member.

In another aspect, the present invention is directed to a method for seating a ring seal within an annular groove of a seal fitting, the seal fitting including first and second end portions in the first passage way therethrough. More specifically, the method generally includes the steps of aligning the ring seal with the annular groove of the seal fitting using a guide member and a ramp member, the guide member including first and second portions and the ramp member including first and second end portions, whereby the ring seal is positionable on the second end portion of the ramp member and the seal fitting is supported by the first portion of the guide member, and advancing the ring seal into the annular groove of the seal fitting using a pusher member, the pusher member being slidable relative to the guide member and the ramp member and including a first end portion for contacting the ring seal, the first end portion of the pusher member being receivable within the first portion of the guide member. More specifically, the step of aligning may comprise the step of positioning the first end portion of the ramp member within the second portion of the guide member. In one embodiment, where the first end portion of the ramp member includes an annular lip portion, the step of aligning includes the step of abuttingly engaging the annular lip portion with a portion of the first end portion of the seal fitting, the portion of the first end portion of the seal fitting being receivable in the annular lip portion of the first end portion of the ramp member. The step of aligning may also include the step of positioning a projection portion of the ramp member within the first passageway or channel of the seal fitting. The step of advancing the ring seal into the annular groove may comprise the step of abuttingly engaging a beveled surface on the first end portion of the pusher member against a correspondingly bevel surface of the ring seal. Such a beveled surface on the first end portion of the pusher member is especially useful in instances where the ring seal includes such a beveled surface, such as in instances where the first end portion of the seal fitting includes a tapered portion.

DETAILED DESCRIPTION OF THE INVENTION

Figure 1:
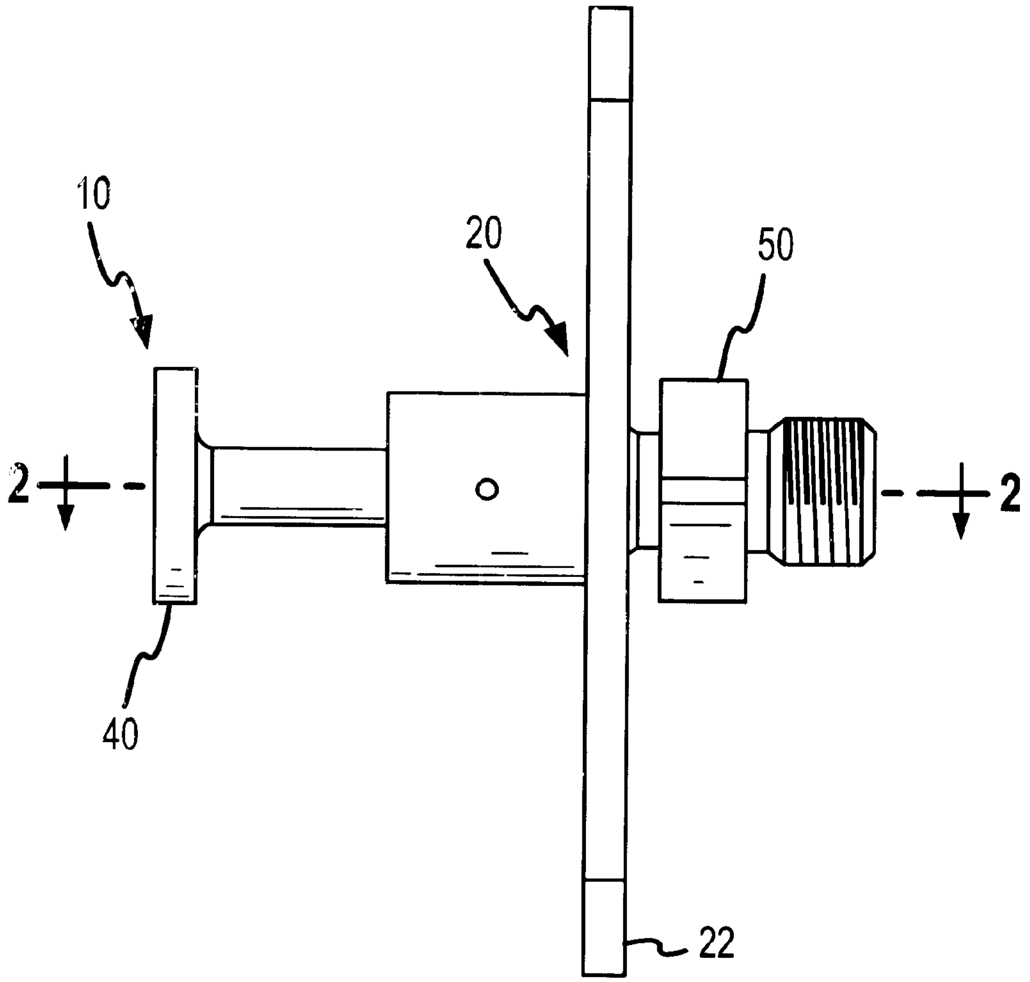
FIG. 1 is a side view of the ring seal tool of the present invention interconnected to a ring seal fitting.
Figure 2:
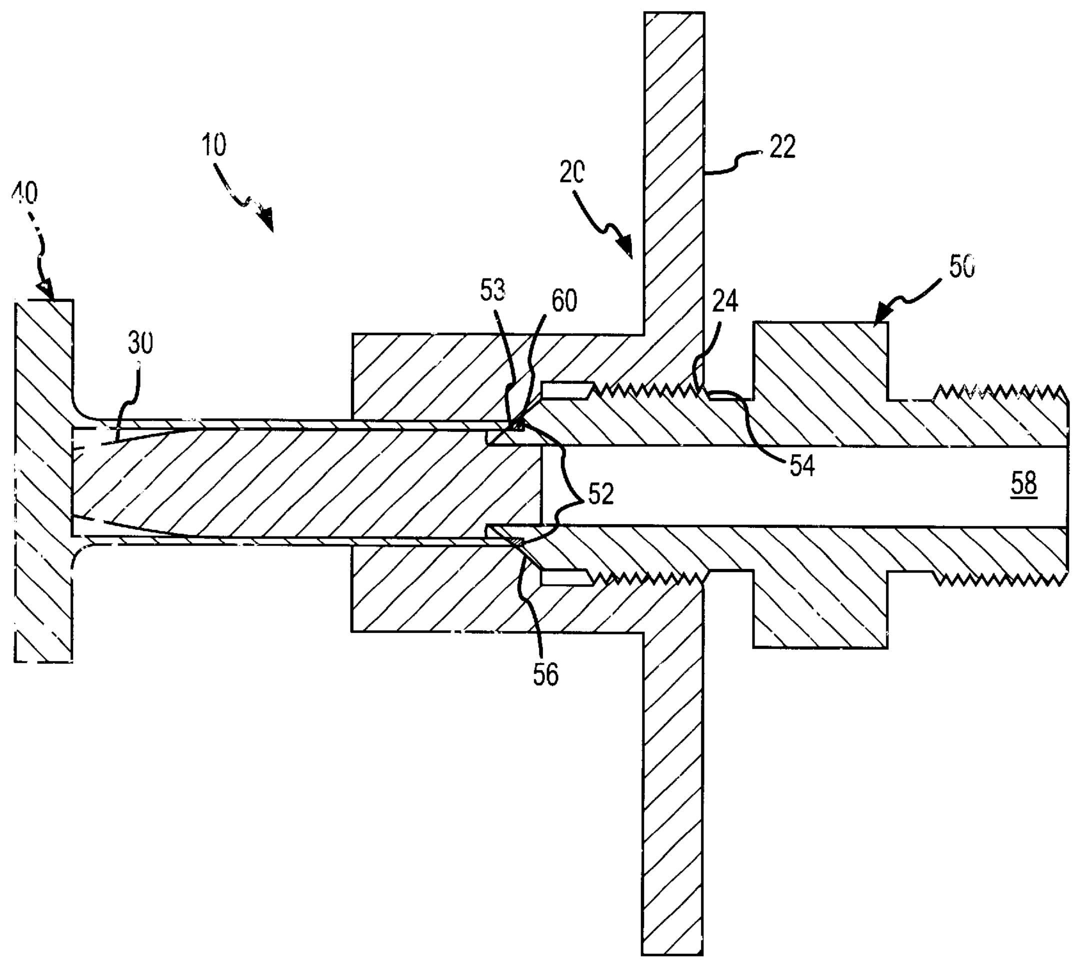
FIG. 2 is a cross-sectional view of the ring seal illustrated in FIG. 1.
Figure 3B:
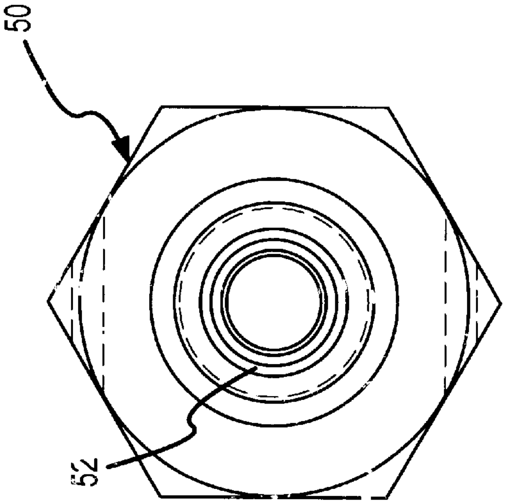
FIGS. 3A–3B are side and end views, respectively, of the ring seal fitting illustrated in FIG. 1.
Figure 3A:
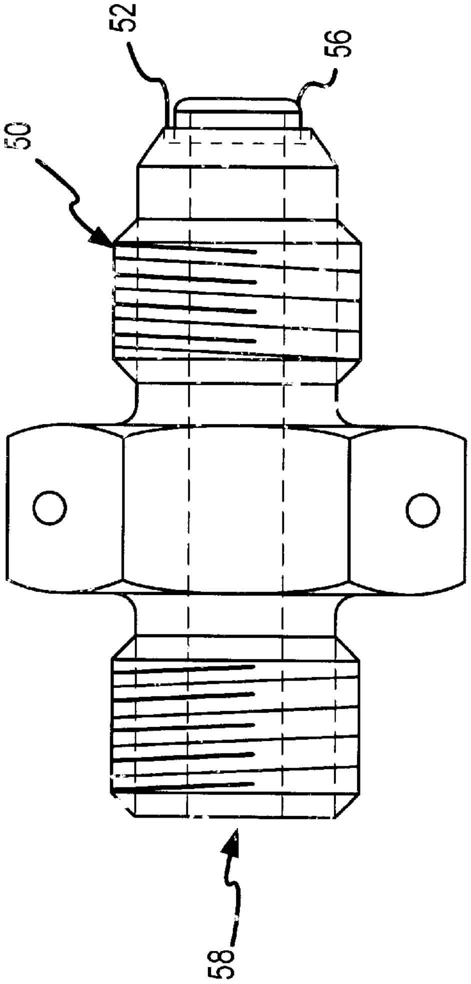
Figure 4:
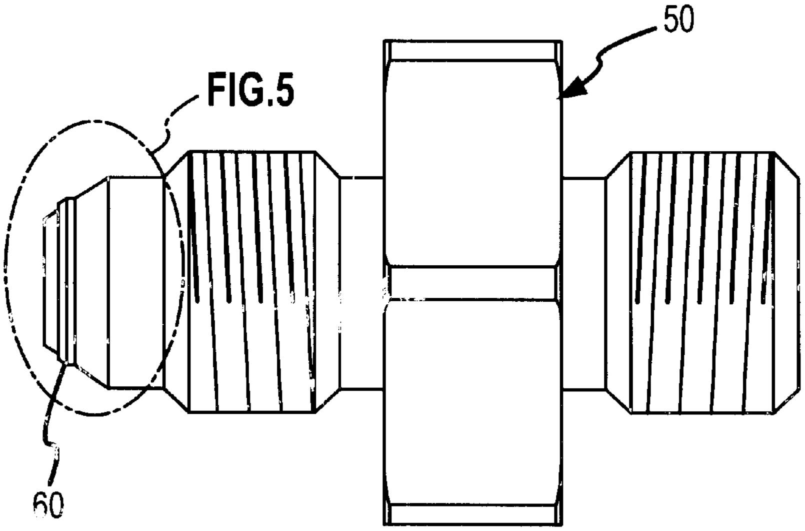
FIG. 4 is a side view of a ring seal fitting with a ring seal positioned within an annular groove of the ring seal fitting.
Figure 5:
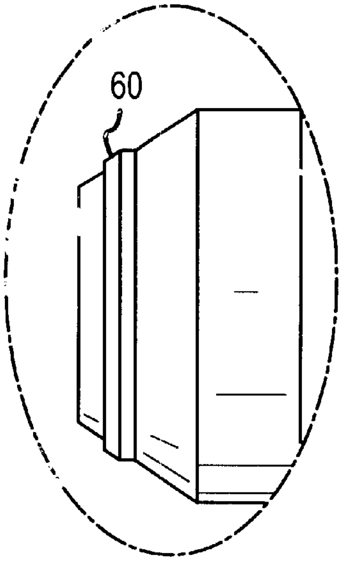
FIG. 5 is an enlarged, side view of the seated ring seal of the circled area 5 illustrated in FIG. 4.
Figure 6:
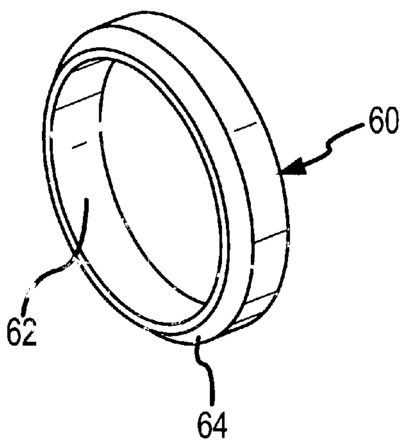
FIG. 6 is a prospective view of a ring seal positionable within an annular groove of a seal fitting.
Figure 9:
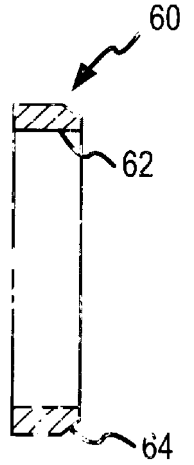
FIG. 9 is a cross-sectional view of the ring seal illustrated in FIG. 8, taken along line 9—9.
Figure 8:
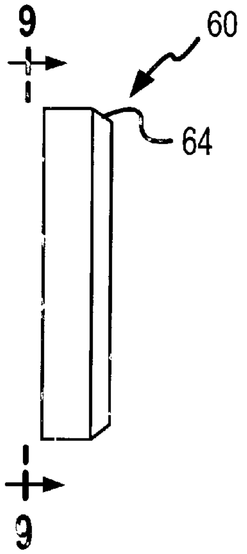
FIG. 8 is a side view of the ring seal illustrated in FIG. 6.
Figure 7:
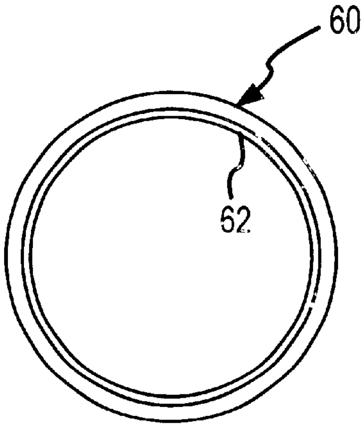
FIG. 7 is an end view of the ring seal illustrated in FIG. 6.
Figure 12:
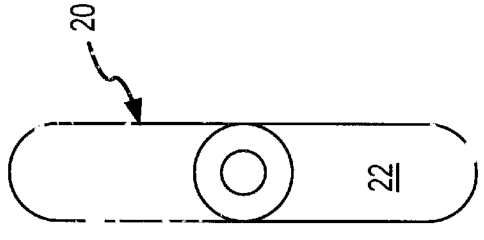
FIG. 12 is an end view of the guide member illustrated in FIG. 10.
Figure 10:
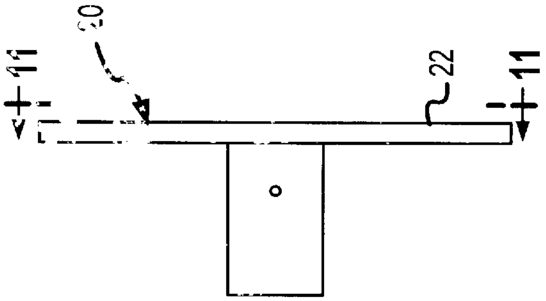
FIG. 10 is a side view of the guide member illustrated in FIG. 1.
Figure 11:
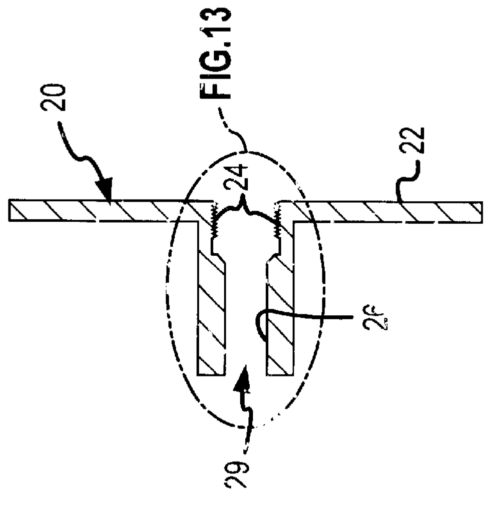
FIG. 11 is a cross-sectional view of the guide member illustrated in FIG. 10, taken along line 11—11.
Figure 14:
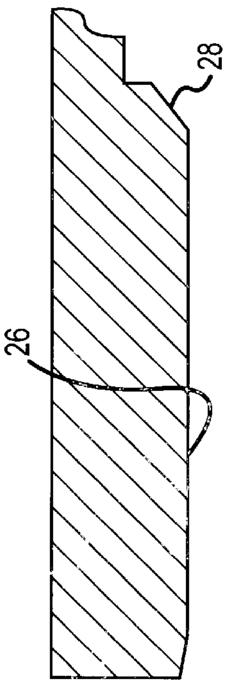
FIG. 14 is an enlarged, cross-sectional view of the guide member of the circled area 14 illustrated in FIG. 13.
Figure 13:
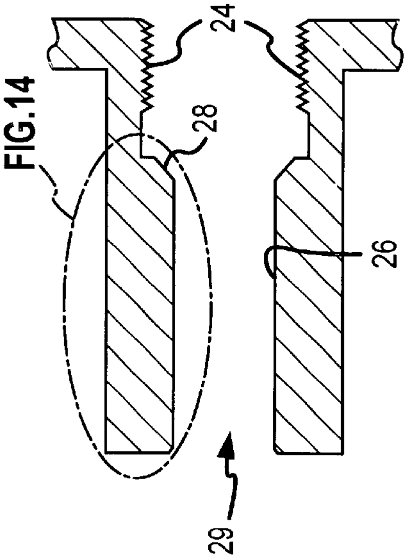
FIG. 13 is an enlarged, cross-sectional view of the guide member of the circled area 13 illustrated in FIG. 11.
Figure 16:
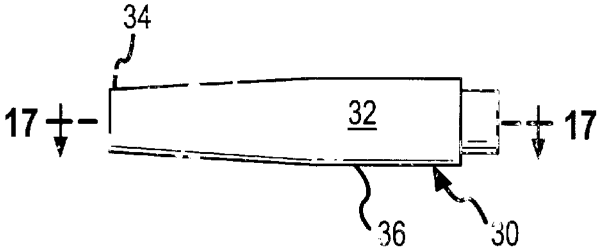
FIG. 16 is a side view of the ramp member illustrated in FIG. 15.
Figure 15:
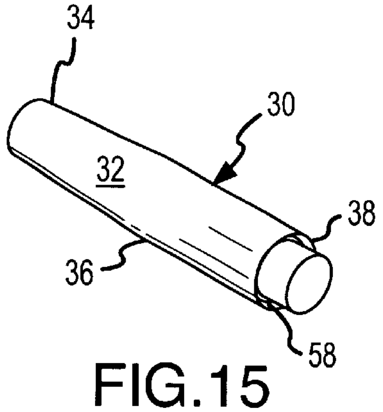
FIG. 15 is a prospective view of the ramp member illustrated in FIG. 1.
Figure 17:
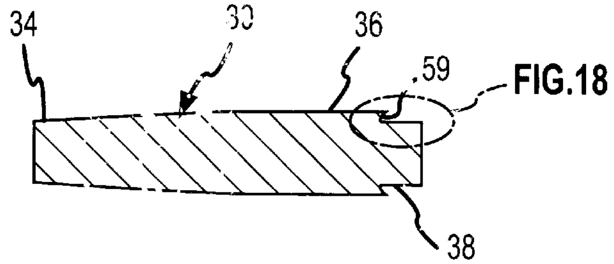
FIG. 17 is a cross-sectional view of the ramp member of FIG. 16, taken along line 17—17.
Figure 18:
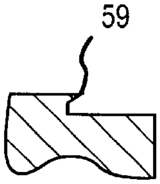
FIG. 18 is an enlarged, cross-sectional view of the circled area 18 of FIG. 17.
Figure 20:
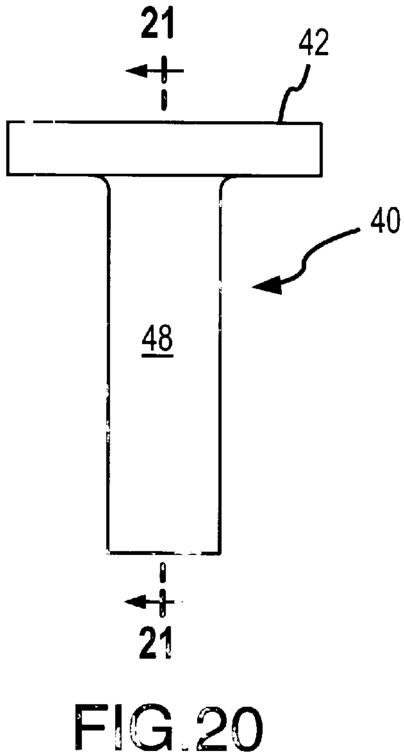
FIG. 20 is a side view of the pusher member illustrated in FIG. 19.
Figure 19:
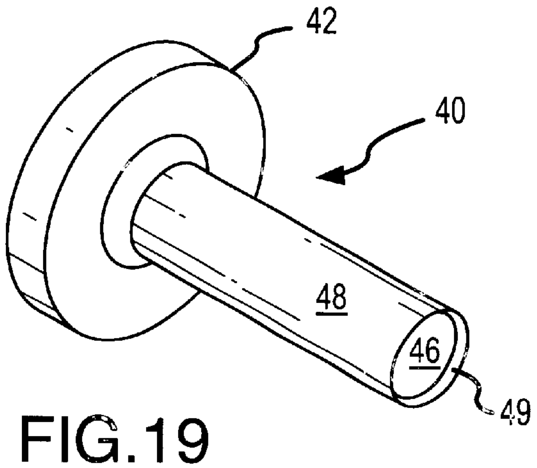
FIG. 19 is a prospective view of the pusher member illustrated in FIG. 1.
Figure 21:
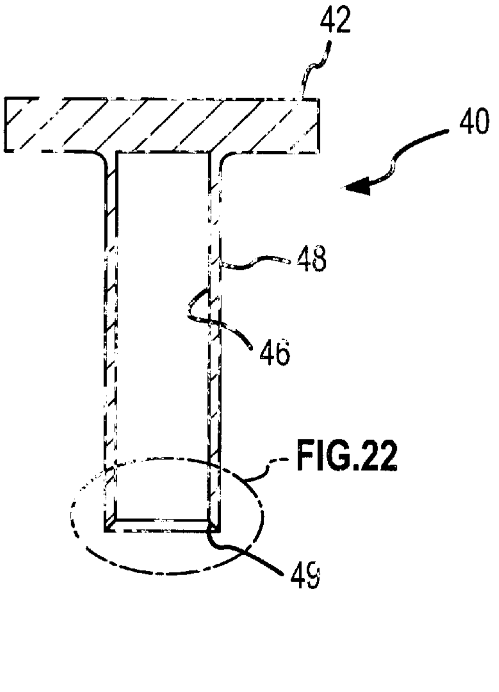
FIG. 21 is a cross-sectional view of the pusher member illustrated in FIG. 20, taken along line 21—21.
Figure 22:
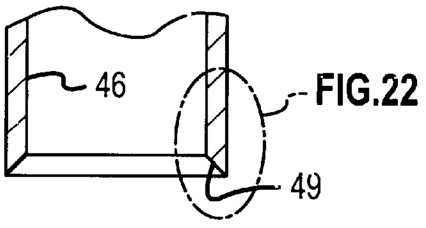
FIG. 22 is an enlarged, cross-sectional view of the circled area 22 of FIG. 21.
Figure 23:
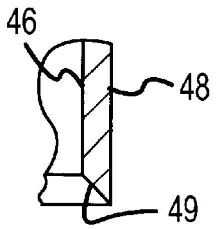
FIG. 23 is an enlarged, cross-sectional view of the pusher member of the circled area 23 of FIG. 22.

Referring to the attached FIGS. 1–23, the ring seal seating tool 10 of the present invention generally includes a guide nut 20, a ramp 30 and a plunger 40.

The guide nut 20 is interconnectable to the ring seal fitting 50 to permit the fitting 50 to be effectively handled and to guide the ramp 30 and plunger 40. In this regard, the guide nut 20 includes a handle portion 22 to allow an operator/user to handle/manipulate the ring seal fitting 50 during seating operations to thus facilitate receipt of the ring seal 60 within the ring seal groove 52 of the ring seal fitting 50 via the ramp 30 and plunger 40 (as will be described in more detail hereinbelow). The guide nut 20 further includes a threaded portion 24 for threadedly engaging the threaded portion 54 of the ring seal fitting 50. For purposes of receiving and guiding the ramp 30 and the plunger 40 towards the end portion 56 of the ring seat fitting 50 to thereby allow the ring seal 60 to be slid over the outer surface of the ramp 30 by the plunger 40 and seated within the ring seal groove 52 of the ring seal fitting 50, the guide nut 20 further includes an annular inner wall 26 having a diameter which substantially corresponds to the outer diameter (as defined by the outer wall 48) of the plunger 40 (e.g., slightly larger than the outer diameter of the plunger to allow the plunger 40 to be received therein). The guide nut 20 also includes an annular angled portion 28 proximate the annular inner wall 26, which is adapted to abuttingly engage the angled end portion 56 of the ring seal fitting 50. In this regard, the annular angled portion 28 is angled about 37° relative to the inner wall 26 of the guide nut 20.

The ramp 30 is generally cylindrical and functions to receive the ring seal 60 about the outer surface 32 of the ramp 30, to stretch the ring seal 60 to a diameter substantially corresponding to the inner wall 53 of the ring seal groove 52 of the rings seal fitting 50, and to align the ring seal 60 with the end portion 56 of the ring seal fitting 50 for proper seating. For purposes of easily receiving the ring seal 60 about the outer surface 32 of the ramp 30, the diameter of the first end portion 34 of the ramp 30 is less than the inner diameter of the ring seal 60, as defined by the inner wall 62 of the ring seal 60. In order to facilitate seating of the ring seal 60 within the ring seal groove 52 of the ring seal fitting 50, the ramp 30 is tapered from the first end portion 34 to an intermediate portion 36 of the ramp 30, and the intermediate portion 36 has a diameter greater than the inner diameter of the ring seal 60, as defined by the inner wall 62. The intermediate portion 36 functions to stretch the ring seal 60 to a diameter substantially corresponding to the diameter of the inner wall 53 of the ring seal groove 52 of the ring seal fitting 50, which facilitates seating of the ring seal 60 within the ring seal groove 52. In order to inhibit galling of the inner wall 62 of the ring seal 60, which slidably engages the outer surface 32 of the ramp 30, at least the outer surface 32 of the intermediate portion 36 of the ramp 30 is smooth and is fabricated from a material having a low coefficient of friction. In a preferred embodiment, at least the outer surface 32 of the ramp 30 is fabricated from Teflon to avoid such galling. In order to enhance seating capability, the second end portion 38 of the ramp 30 is sized to be receivable within the flow passageway 58 of the ring seal fitting 50. As such, the diameter of the second end portion 38 of the ramp 30 substantially corresponds to the diameter of the passageway 58 of the ring seal fitting 50. And, for purposes of receiving the beveled end portion 56 of the ring seal fitting 50, such that the ring seal 60 is advancable from the intermediate portion 36 into the ring seal groove 52 of the ring seal fitting 50, the second end portion 38 of the ramp 30 includes an annular lip 59 which substantially corresponds in angularity to the beveled end portion 56 of the ring seal fitting 50 (e.g., about 37°). Such receivability of the second end portion 38 within the flow passageway 58 and the engagement of the beveled end portion 56 of the ring seal fitting 50 with the annular lip 59 ensures alignment of the ring seal 60 advancable along the ramp 30 and the ring seal groove 52.

The plunger 40 functions to advance/push the ring seal 60 over the intermediate portion 36 of the ramp 30, towards the second end portion 38 of the ramp 30, and into the ring seal groove 52 of the ring seal fitting 50. The plunger includes a handle portion 42 to allow the user/operator to effectively grip the plunger 40 to advance the ring seal 60 into the ring seal groove 52. The plunger 40 further includes an annular tube portion 44 having inner and outer walls 46, 48 and a beveled end portion 49. The inner wall 46 of the plunger 40 is sized to slidably engage the outer wall 32 of the ramp 30 and to substantially abuttingly engage the ring seal 60. The outer wall 48 of the plunger 40 has an outer diameter which substantially corresponds to (e.g., is slightly less than) the diameter of the inner wall 26 of the guide nut 20, which enables the plunger 40 to be aligned with the ring seal groove 52 and to be received within the channel 29 of the guide nut 20 defined by the inner wall 26 of the guide nut 20. The beveled end portion 49 of the plunger 40 functions to abuttingly engage the correspondingly beveled portion 64 of the ring seal 60 to thus inhibit scarring of the ring seal 60 during advancement of the ring seal 60 by the plunger 40. In this regard, the beveled end portion 49 is particularly useful to avoid damaging ring seals during seating operations and subsequent replacement since ring seals typically have a beveled portion 64 (e.g., angled at about 37° relative to the inner wall 62 of the seal ring 60.

Ring seals seated within ring seal grooves with the tool 10 of the present invention are typically fabricated from relatively flexible materials, such as Teflon, Kel-F, Vespel, EPR, silicon or other similar materials. Such ring seals ad ring seal fittings are commercially available from various vendors, including Allan Aircraft Supply Co, of No. Hollywood, Calif.

As noted hereinabove, the ring seal seating tool 10 of the present invention is particularly suited for installing or seating ring seals into ring seal grooves of ring seal fittings. In use, the threaded portion 24 of the guide nut 20 may be threadedly engaged with the threaded portion 54 of the ring seal fitting 50, such that the ring seal fitting 50 is easily handleable by an operator. Thereafter, the second end portion 38 of the ramp 30 may be inserted into the flow passageway 58 of the ring seal fitting 50, and the ring seal may be placed over the first, tapered end portion 34 of the ramp 30. In order to slide or push the ring seal into place within the ring seal groove 52 of the ring seal fitting 50, the plunger 40 may be slid over the first end portion 34 of the ramp 30 such that the beveled end portion 49 of the plunger abuttingly engages the beveled portion 64 of the ring seal 60. As the plunger 40 is advance/pushed toward the guide nut 20, the ring seal 60 is pushed into the ring seal groove 52 of the ring seal fitting 50. The plunger 40 may be pushed by an operator or user via the handle portion 42 until the ring seal 60 is seated, as evidenced by a “pop” which can be felt and/or heard by the operator. Thereafter, the ring seal fitting 50 having the ring seal 60 seated within the ring seal groove 52 may be unthreaded from the guide nut 20, and reinstalled within the aerospace system. Advantageously, use of the ring seal seating tool 10 of the present invention significantly reduces the amount of time for an operator to install/seat a ring seal within the ring seal groove of a ring seal fitting from about 30 minutes to less than 1 minute, which further facilitates compliance with clean requirements.

It should be noted that the ring seal seating tool 10 of the present invention can be sized to install ring seals of varying diameters (e.g., ¼", ⅜", ½", etc.). Further, the guide nut 20 and the plunger 40 can be fabricated from various rigid materials, such as metals and hard plastics. In addition, the seating tool of the present invention may be used in connection with seating ring seals on many different types of ring seal fittings (e.g., standard, elbow, cross, tee, bulkhead, reducer, union, expander, etc.).

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A tool for positioning a ring seal within annular groove on tapered first end portion of a seal fitting, the seal fitting having a first passgeway extending therethrough, said tool comprising:

a ramp member adapted to receive the ring seal, said ramp member including first and second end portions and a first wall, wherein said first end portion of said ramp member includes an annular lip for receiving at least a portion of the first end portion of the seal fitting;

a pusher member for moving the ring seal along said ramp member, into the annular groove, said pusher member including a first end portion for engaging the ring seal; and a guide member for supporting the seal fitting, said guide member including first and second portions, wherein said first portion of said guide member is adapted to supportably engage the seal fitting and said second portion of said guide member is adapted to guide said pusher member towards the first end portion of the seal fitting, said first end portion of said pusher member being receivable within said second portion of said guide member.

2. A tool as claims in claim 1, wherein said first end portion of said ramp member includes an angled surface adapted to abuttingly engage at least a portion of the first end portion of the seal fitting.

3. A tool as claimed in claim 1, wherein the ring seal includes a first beveled surface, wherein said first end portion of said pusher member includes a first surface adapted to abuttingly engage the first beveled surface of the ring seal.

4. A tool as claimed in claim 1, wherein said first portion of said guide member is threadedly engageable with the seal fitting.

5. A tool as claimed in claim 1, wherein said second portion of said guide member is adapted to receive said first end portions of said pusher member and said ramp member.

6. A tool as claimed in claim 1, wherein said second portion of said guide member includes a first inner wall, said first end portion of said pusher member being slidable relative to said first inner wall.

7. A tool as claimed in claim 1, wherein said second end portion of said ramp member is tapered, wherein said first wall at said second end portion of said ramp member defines a second diameter less than a first diameter defined by said first wall at said first end portion of said ramp member.

8. A tool as claimed in claim 7, wherein said first diameter defined by said first wall at said first end portion substantially corresponds to a first groove diameter defined by an inner wall of the annular groove of the seat fitting.

9. A tool as claimed in claim 1, wherein said first end portion of said ramp member includes a projection portion adapted to be received within the first passageway of the seal fitting.

10. A tool as claimed in claim 9, wherein the first passageway is defined by an inner wall and said projection portion includes a first annular wall, wherein said first annular wall of said projection portion is adapted to abuttingly engage the inner wall of the first passageway.

11. A tool for positioning a ring seal within an annular groove on a tapered first end portion of a seal fitting, the seal fitting having a first passageway extending therethrough, said tool comprising:

a ramp member adapted to receive the ring seal, said ramp member including first and second end portions and a first wall, wherein said first end portion of said ramp member includes an angled surface adapted to abuttingly engage at least a portion of the first end portion of the seal fitting, a pusher member for moving the ring seal along said ramp member, into the annular groove, said pusher member including a first end portion for engaging the ring seal; and a guide member for supporting the seal fitting, said guide member including first and second portions, wherein said first portion of said guide member is adapted to supporably engage the seal fitting and said second portion of said guide member is adapted to guide said pusher member towards the first end portion of the seal fitting, said first end portion of said pusher member being receivable within said second portion of said guide member.

12. A tool as claimed in claim 11, wherein the first end portion of the seal fitting is tapered, wherein said first end portion of said ramp member includes an annular lip for receiving at least a portion of the first end portion of the seal fitting.

13. A tool as claimed in claim 11, wherein the ring seal includes a first beveled surface, wherein said first end portion of said pusher member includes a first surface adapted to abuttingly engage the first beveled surface of the ring seal.

14. A tool as claimed in claim 11, wherein said second end portion of said guide member includes a first inner wall, said first end portion of said pusher member being slidable relative to said first inner wall.

15. A tool as claimed in claim 11, wherein said second end portion of said ramp member is tapered, wherein said first wall at said second end portion of said ramp member defines a second diameter less than a first diameter defined by said first wall at said first end portion of said ramp member.

16. A tool as claimed in claim 11, wherein said first end portion of said ramp member includes a projection portion adapted to be received within the first passageway of the seal fitting.

17. A tool for positioning a ring seal within an annular groove on a tapered first end portion of a seal fitting, the seal fitting having a first passageway extending therethrough, said tool comprising:

a ramp member adapted to receive the ring seal, said ramp member including first and second end portions and a first wall;

a pusher member for moving the ring seal along said ramp member, into the annular groove, said pusher member including a first end portion for engaging the ring seal; and a guide member for supporting the seal fitting, said guide member including first and second portions, wherein said first portion of said guide member is threadedly engageable with the seal fitting and said second portion of said guide member is adapted to guide said pusher member towards the first end portion of the seal fitting, said first end portion of said pusher member being receivable within said second portion of said guide member.

18. A tool as claimed in claim 17, wherein said second portion of said guide member is adapted to receive said first end portions of said pusher member and said ramp member.

19. A tool as claimed in claim 17, wherein said second portion of said guide member includes a first inner wall, said first end portion of said pusher member being slidable relative to said first inner wall.

20. A tool as claimed in claim 17, wherein said first end portion of said ramp member includes a projection portion adapted to be received within the first passageway of the seal fitting.

* * * * *

UNITED STATES PATENT AND TRADEMARK OFFICE

CERTIFICATE OF CORRECTION

PATENT NO. : 6,349,459 B1
DATED : February 26, 2002
INVENTOR(S) : Dean, Michael Bruce It is certified that error appears in the above-identified patent and that said Letters Patent is hereby corrected as shown below:

Column 6,
Line 14, after the word "within", insert -- an --;
Line 15, after the word "on", insert -- a --;
Line 16, delete the word "passgeway" and insert therefor -- passageway --;
Line 36, delete the word "claims" and insert therefor -- claimed --; and Column 7,
Line 23, delete the word "supporably" and insert therefor -- supportably --.

Signed and Sealed this

Fourth Day of June, 2002

*Attest:*

JAMES E. ROGAN

*Attesting Officer* *Director of the United States Patent and Trademark Office*